United States Patent

[11] 3,624,456

[72] Inventor James O. Elliott
 Xenia, Ohio
[21] Appl. No. 19,307
[22] Filed Mar. 13, 1970
[45] Patented Nov. 30, 1971
[73] Assignee General Motors Corporation
 Detroit, Mich.

[54] ELECTRONIC CONTROLLER FOR AUTOMATIC LEVELING SYSTEM
 4 Claims, 4 Drawing Figs.

[52] U.S. Cl. .................................................. 317/141 S,
 317/148.5 R
[51] Int. Cl. .......................................................... H01h 47/32,
 H01h 47/18
[50] Field of Search ........................................... 317/141 S,
 142, 148.5

[56] References Cited
UNITED STATES PATENTS 2,867,754 1/1959 O'Bleness .................. 317/141 S
3,154,168 10/1964 Wilmot ...................... 317/141 S
3,334,243 8/1967 Cooper ....................... 317/141 S Primary Examiner—L. T. Hix
Attorneys—W. S. Pettigrew and J. C. Evans ABSTRACT: In preferred form, an electronic control for an electrically operated automatic vehicle leveling system which includes a relay coil and a solenoid operated valve coil that are both connected to one terminal of a three terminal solid-state switching device in the form of a pair of transistors in a Darlington configuration. The base emitter junction of the Darlington pair is connected to a RC timing circuit through a low cost switching transistor. An undamped height sensor switch connects the charging circuit to the positive terminal of a vehicle battery and the switching transistor closes to charge a capacitor of the RC circuit from a negative reference voltage to a positive turn on voltage at the base of the Darlington pair. Following a predetermined time delay the Darlington pair is turned on to complete an energization circuit for one or the other of the coils. If the undamped switch opens before the end of a time delay cycle, the positive side of the capacitor is recharged to the battery voltage through a reset circuit to prevent normal road movements from affecting the operation of the circuit.

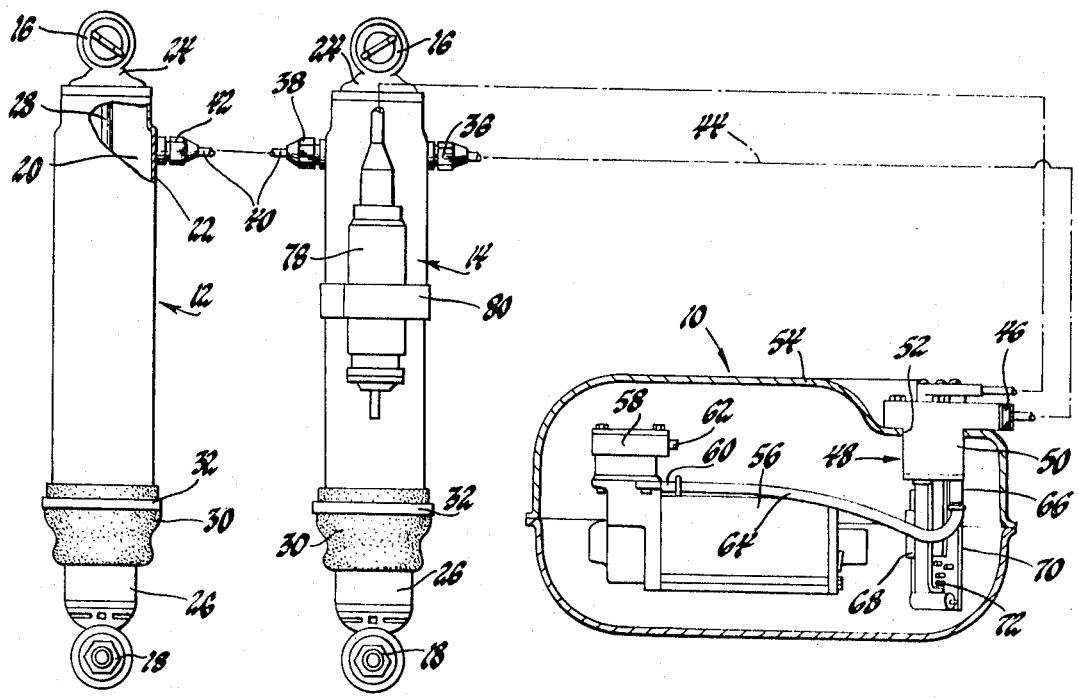

INVENTOR.
James O. Elliott
J.C. Evans
BY
ATTORNEY

ELECTRONIC CONTROLLER FOR AUTOMATIC LEVELING SYSTEM

This invention relates to electronic controllers and more particularly to electronic timers having means for selectively energizing a plurality of separate loads following a predetermined time delay.

Automatic electrically operated vehicle-leveling systems include an electric motor driven compressor which either pumps up or exhausts fluid from a pair of auxiliary load supporting fluid springs connected between the sprung and unsprung mass of a vehicle to maintain a predetermined height relationship therebetween when the primary suspension springs are either shortened or lengthened because of the change of the vehicle load.

In certain ones of these automatic leveling systems there are two separate electrically energizable components, for example, a relay operated motor control switch that connects the compressor drive motor to a power source during, for example, an exhaust phase of operation and an electrically energizable coil for a solenoid valve that will connect a pressure source to the fluid springs during a pump up phase of operation.

In some automatic leveling systems the components are connected to the power source through a mechanically damped height sensor switch that is only responsive to a sustained change in the height relationship between the sprung chassis of the vehicle and an unsprung portion thereof such as the axle housing of the rear suspension assembly of the vehicle.

Such damped mechanical valves require connection of separate linkage between an operating arm of the valve and an adjacent portion of the sprung and unsprung mass. Such arrangements are comparatively costly.

Other vehicle leveling systems include an undamped electrical height sensor switch that may require a like linkage. Such arrangements are less costly, however, they respond to normal road movements to operate the system through exhaust and pump up phases when vehicle height correction is not required.

Accordingly, an object of the present invention is to provide an improved all-electric controller for an automatic vehicle-leveling system wherein a low-cost undamped double-pole, double-throw switch is used to sense the height relationship between the sprung and unsprung masses of the vehicle and where a timing circuit and three-terminal solid-state switching device are included in circuit with the undamped switch and the control components of the leveling system to prevent operation thereof in response to normal road movements.

Still another object of the present invention is to provide a motor control circuit having a relay-operated switch with a coil electrically connected to a three terminal switching device which has a timing circuit electrically connected to a power source and operative to produce a predetermined time delay before operation of the motor control relay coil and wherein the timing circuit includes a switching transistor which is closed by a signal to initiate the time delay and which is opened for resetting the timing circuit anytime that the signal thereto is interrupted.

Still another object of the present invention is to provide a low cost solid state timer including a static amplifier having its base emitter junction connected to a timing circuit including a capacitor having its negative side connected to the base and its positive side connected through a low-impedance path to a power source and wherein a high impedance in the timing circuit provides a predetermined long-duration delay for charging the negative side of said capacitor to a full positive charge when a current path is completed through the timing circuit; and wherein when the timing circuit is disconnected the low impedance path to the positive side of the capacitor will react the capacitor to a full charge on the opposite side thereof at a time ratio corresponding to that of the impedance in the timing circuit and the impedance in the low-impedance connection to the positive side of the capacitor.

Still another object of the present invention is to provide an arrangement as set forth in the immediately preceding object wherein the timing circuit includes a capacitor having its negative side electrically connected to the control terminal of the static amplifier and the positive side thereof electrically connected to a ground point through a low-cost NPN-transistor and wherein the circuit includes an impedance path to the base of the NPN-transistor for turning it on each time a height sensor switch connects an electrical component to the power source to initiate a delay period which prevents energization of the electrical components of a leveling system by normal road movements of the vehicle.

Still another object of the present invention is to provide an improved electronic switching device and timer for selectively operating a plurality of separate loads including a power static amplifier; a resistance capacitor circuit electrically connected to the control terminal of said amplifier and to a switching transistor for reset; a circuit energized when the power supplies are connected to a power source for turning on the transistor to start charging of the capacitor; said amplifier having its cathode anode terminals electrically connected to each of the energizable components for completing a current path through the component that is connected to the power supply following the delay period; a pair of diodes each connected between the electrical component that is energized and the charging circuit for the capacitor are operative to prevent cross current flow to the other of the electrical components when deenergized; and means for resetting the charging circuit when the switching transistor is off including a relatively low impedance path from a power source to the positive side of the capacitor of the charging circuit to produce a reset time that is substantially less than the time delay period of the circuit.

These and other objects are attained in one working embodiment of the invention in a system that includes two spaced apart auxiliary load supporting combination shock absorber and air spring units each having their top and bottom mounts adapted to be connected respectively between the lower frame of the vehicle body and the rear axle housing of the rear suspension of the vehicle. The system includes a double pole, double throw switch that is strapped on one side of one of the units to sense the height relationship between the top of the shock absorber and a surrounding dust shield portion of the shock absorber which in turn represents the height relationship between the vehicle body and the axle housing.

When the vehicle body is above a desired height relationship the switch is in a first position wherein an electric motor is energized to pump down both of the auxiliary load carrying air springs on the combination unit and to increase the pressure within a storage tank. When the vehicle body is below the desired height relationship the switch is positioned to energize a solenoid valve for connecting the pressurized tank with the air spring means to increase the pressure level therein; to raise its load supporting capacity; to return the vehicle body to a desired height relationship with the axle housing.

The switch is an undamped mechanism that electrically connects first and second electrical components in the system to the positive terminal of the vehicle battery. An electronic control module receives a signal from the switch each time it connects one or the other of the components to the battery to charge a timing circuit that delays energization of a static amplifier that powers the electrical components in the system.

The time delay is selected to prevent operation of the electrical components in response to ordinary vehicle road movements.

A switching transistor is turned on each time one of the components is invention; to the power supply to complete the timing circuit. When the undampened switch on the air spring is turned off the switching transistor is turned off and the timing circuit is reset. Thus, only a sustained load change that maintains the undamped height sensor switch continuously closed will cause the timing circuit to condition the static amplifier conductive thereby to energize one of the other of the components to produce a change in the pressure level of the air springs for leveling.

Further objects and advantages of the present invention will be apparent from the following description, reference being had to the accompanying drawings wherein a preferred embodiment of the present invention is clearly shown.

FIG. 1 is a diagrammatic view of a leveling system including the present invention;

FIG. 2 is an electric circuit diagram of a control system for regulating the electrical components of the system of FIG. 1;

Figure 3:
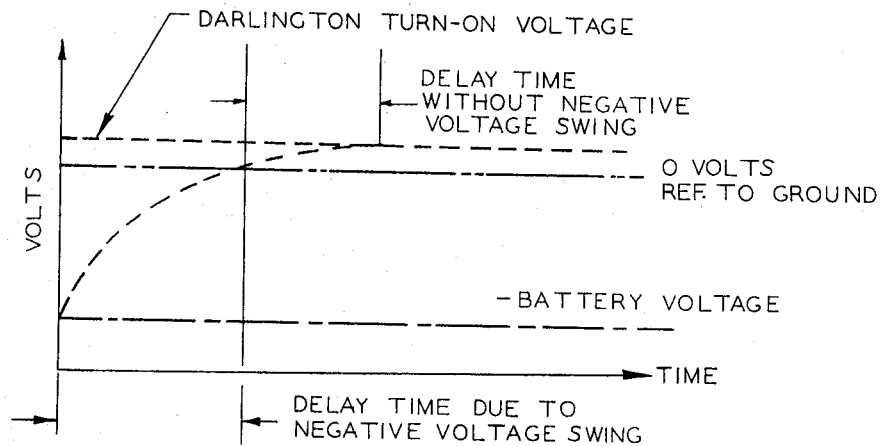
FIG. 3 is a chart shown the charge rate of a capacitor in the present invention.

Referring now to the drawings, in FIG. 1 a fully automatic electric closed-loop vehicle-leveling system 10 is illustrated. It includes a pair of combination shock absorber and air spring units 12, 14 each of which includes a top end mount assembly 16 and a bottom end mount assembly 18. The top end mount assembly 16 is adapted to be connected to the bottom frame of a vehicle body which represents a sprung mass. The bottom end mount 18 is adapted to be connected to a portion of the rear suspension assembly, for example, the rear axle housing which represents an unsprung mass in the system.

Both of the units 12, 14 represent an auxiliary load supporting device that is associated with a primary load supporting spring (not shown) that maintains a predetermined curb height between the vehicle body and the axle housing when the vehicle is unloaded.

In order to maintain this predetermined curb height or any other predetermined height relationship, the vehicle-leveling system 10 is operated to vary the pressure in a variable volume pressurizable fluid chamber 20 of each unit 12, 14 formed between a dust tube 22 closed at its upper end by a cap 24 and an outer shock absorber cylinder 26.

In the illustrated arrangement the shock absorber also includes a piston rod 28 that moves exteriorly of cylinder 26.

The chamber 20 is closed by a flexible sleeve 30 that has one end thereof fastened to the open lower end of the dust tube 22 by a clamp ring 32 and the opposite end thereof secured to the outer periphery of the cylinder 26 by a like clamp ring (not shown).

The chamber 20 of the unit 14 has an inlet fitting 36 thereon and an outlet fitting 38 that is joined by a crossover tube 40 to an inlet fitting 42 to the chamber 20 of the unit 12. A common exhaust and supply conduit 44 has one end thereof connected to the inlet fitting 36 and the opposite end thereof connected to a fitting 46 on a combination valve and fluid supply assembly 48.

In the illustrated arrangement the assembly 48 includes a housing 50 that is supported in an opening 52 of a pressurized storage tank 54.

An electric compressor drive motor 56 is supported within the tank 54. It drives an air compressor 58 having an inlet 60 and an outlet 62.

The outlet 62, more particularly, is in direct communication with the interior of tank 54 and the inlet 60 is connected to one end of a spring-reinforced suction tube 64 that has the opposite end thereof connected to a tube member 66 depending from the housing 50.

In the illustrated arrangement the electrical drive motor 56 is controlled by a relay operated switch 68 that is supported on one side of a circuit board 70 along with an electronic control module 72 to be described.

The relay 68 constitutes a first electrically energizable component for controlling the operation of the leveling system 10.

Additionally, the system includes a solenoid operated valve 74 (see FIG. 2) which communicates the interior of tank 54 with the conduit 44 when a coil 76 thereof is energized.

The coil 76 constitutes a second electrically energizable component for regulating the operation of the leveling system 10.

The system further indicates a height sensor switch 78 that is held on one side of the unit 14 by a strap 80 to position a contact carrying movable arm 86 with respect to a first pair of motor contacts 88 and a second pair of solenoid contacts 90 both of which are maintained normally open and are bridged when the movable arm 86 is in engagement therewith.

The height sensor switch 78 is a low cost non-damped unit that senses each relative movement of the dust tube 22 with respect to the shock absorber cylinder 26 which reflects normal road movements between the sprung and unsprung mass of the vehicle.

In accordance with certain principles of the present invention the electronic control module 72 includes means for producing a predetermined time delay in the system to prevent operation of the system by normal road movements of the vehicle. Additionally, the module 72 includes means that constitute a controller for the motor 56 to energize it following periods when the vehicle is unloaded thereby to cause the auxiliary load supporting devices 12, 14 to be pumped down to level the vehicle.

A further feature is that the module 72 includes means for controlling the electrical solenoid to be operative following a sustained addition of load to the vehicle to pump up or pressurize the auxiliary load supporting devices 12, 14 to correct for spring compression that would locate the chassis of the vehicle below a predetermined height relationship with respect to an unsprung mass portion of the vehicle. When the solenoid operated valve 74 is energized it directs a predetermined amount of air from the interior of the pressurized tank 54 into the variable volume pressurizable chambers 20 of the devices 12, 14.

The module 72 is more particularly set forth in the control circuit of FIG. 2 which is illustrated as including a DC battery 92, for example, a 12 volt rated vehicle battery. Additionally, the circuit includes an ignition switch 94 and the double-pole double-throw switch 90 operated by the height sensor 78 on the side of the device 10.

The circuit includes a first power circuit for control of the motor including a conductor 96 connected to the positive terminal of the battery 92 and a conductor 98 electrically connected to one terminal of normally open switch 88. The other terminal thereof is electrically connected by a conductor 99 to one side of a motor relay coil 100 that has the opposite side thereof electrically connected by a conductor 102 thence through a conductor 104 to the anode terminal of a solid-state switching device of a Darlington amplifier 106 that is maintained normally off. When device 106 is electrically conductive the coil circuit is completed through a conductor 108 to ground.

Additionally, the circuit includes a solenoid coil power circuit from conductor 96 thence through a conductor 110 to the ignition switch 94 thence through a conductor 112 to one terminal of second normally open switch 90 that has the other terminal thereof connected by a conductor 114 to one side of a solenoid valve coil 116 surrounding a valve armature 118.

The opposite side of the coil 116 is connected by a conductor 120 to the previously described portion of the electrical circuit through the solid-state switching device 106 thence to ground.

The solid state switching device 106 is under the control of a timing circuit that is electrically connected to both of the aforementioned power circuits under the control of the height sensor 78.

The timing circuit more particularly includes, in the case of the motor power circuit, a conductor 122 from conductor 99 which is connected to a diode 124 which in turn is electrically connected to a resistor 126 thence to the negative terminal of a capacitor 128. Additionally, a conductor 130 electrically connects the base or control terminal of the solid-state switching device 106 to the RC timing circuit represented by the resistance 126 and the capacitor 128.

The RC circuit is completed from the positive terminal of the capacitor 128 through a NPN test transistor 132 that has its emitter electrically connected by a conductor 134 to conductor 108 to ground.

In the case of the solenoid coil circuit the timing circuit is constituted by a conductor 136 that is electrically connected to one side of a diode 138 which has its opposite side electrically connected by a crossover conductor 140 to the aforementioned RC timing circuit including the resistor 126, the capacitor 128 and the normally closed reset transistor 132.

Additionally, the control circuit includes a signal circuit to the transistor 132 which is energized if either of the aforementioned motor power or solenoid power circuits are completed by the height sensor switch 78. More particularly, it includes a conductor 142 electrically connecting the crossover conductor 140 to one side of a resistor 144 which has the opposite side thereof electrically connected by a conductor 146 to the base of the transistor 132. A resistor 148 electrically connects the base-emitter junction of the transistor 132 to the conductor 108 to ground.

In addition, the circuit includes a circuit from the positive terminal of the battery 92 to a conductor 150 which is electrically connected by conductor 152 to one contact of a relay operated motor control switch 68 which has the other contact thereof electrically connected by a conductor 154 to one side of the electric drive motor 56 which has the opposite side thereof electrically connected by conductor 156 to ground. A contact carrying armature 158 is operated to close the relay contacts when the coil is energized to complete the motor circuit.

Additionally, the conductor 150 is electrically connected to one end of a resistor 160 which in turn is electrically connected by conductor 162 to define a low-impedance path to a junction between the positive terminal of the capacitor 128 and the collector of the transistor 132.

Operation of the system produces a signal when the vehicle is riding above or below a predetermined normal riding level; the signal is from the positive terminal of the battery 92 through height sensor 78 thence through either the power circuit of the motor relay coil or that of the solenoid coil to the RC timing circuit defined by resistor 126, capacitor 128 and transistor 132. Furthermore, the circuit includes means to operate either the solenoid valve or the compressor in response to a continued vehicle riding height signal representing a change in loading of the vehicle.

Under a no signal condition when the vehicle is level and the movable contact of the sensor 78 is positioned in open relationship with respect to both the switch contacts 88 and the switch contacts 90, the transistor 132 is turned off thereby acting as an open switch to ground. The capacitor 128 during this period is charged from battery 92, conductor 150, the resistance 160 to the positive terminal of the capacitor. The level of charge on the positive terminal of the capacitor 128 will equal that of the voltage of the battery 92 which can, in the case of a standard 12 volt rated battery, vary in a range from 10 to 15 volts depending upon the condition of the battery.

When either the switch 88 in the motor power circuit or the switch 90 in the solenoid power circuit is closed, the transistor 132 is immediately turned on by current applied to its base from either of the power circuits. This completes the above-defined resistance capacitor charging circuit.

At this point in the system operation, the capacitor voltage at the base of the Darlington pair 106 is now a negative voltage with reference to ground an amount equal to the battery voltage.

Additionally, the capacitor 128 is connected to ground through the transistor 132. As shown in FIG. 3, the capacitor charges in the opposite direction from this minus battery voltage to approximately 1 volt positive. When a certain predetermined positive voltage is reached, there is a base current flow which turns on the Darlington pair 106. It conducts from its anode to its cathode terminal and provides a current path to ground for either the relay coil 100 or solenoid coil 116. The delay time is measured from the time the signal turns on the transistor 132 to the time that the Darlington amplifier 106 is conductive. The delay time due to negative voltage firing spreads the total delay time without the need for an expensive high mfd. rated capacitor.

Figure 4:
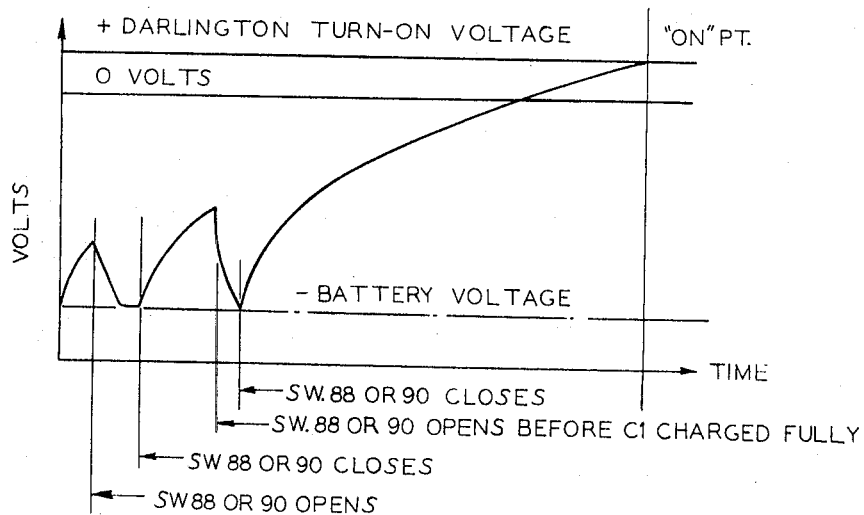
FIG. 4 is a chart showing reset and time delay features of the control circuit of the present invention.

The charging time of the capacitor 128 also is set by resistor 126 which is large with respect to the other resistors in the network. When the sensor switch 78 has its switches 88, 90 opened, the transistor 132 immediately turns off. The resistor 160 is relatively small compared to the resistor 126 and the capacitor 128 thereby is recharged to the negative battery voltage in a very short length of time as compared to the time period following closure of the contacts 88, 90 to reach the Darlington turn on voltage. This reset characteristic is set forth in the graph of FIG. 4.

This way, a long-delay time may be achieved with a small capacitor 128 and a very fast reset time is also available.

This fast reset time is due to the switching action of the transistor 132 and the relatively low resistance value of the resistor 160. The long delay time to reach Darlington turn on voltage is due to the large voltage swing which the capacitor must undergo before the Darlington turn on voltage is reached. This is because of a high-impedance path defined by resistor 126. The large swing of voltage also is due to the fact that the capacitor 128 is initially charged, at the base of the Darlington amplifier 106, negative with respect to ground.

The primary function of the unidirectional current diodes 124, 138 in the circuit is to insure that only one component (either the solenoid valve or the electric motor driven air pump) is turned on when the Darlington pair 106 is turned on.

When the switch 90 is closed by a large load increase on the vehicle a period of time elapses until the Darlington turn on voltage is reached. When this occurs the solenoid valve 74 opens and, as shown in FIG. 1, high-pressure fluid from within the tank 54 passes through the conduit 44 into both of the auxiliary load supporting devices 12, 14 thereby producing a resultant uplifting force on the chassis of the vehicle that supplements that of the primary coil spring to return the vehicle chassis to its desired level operating position.

When the vehicle is unloaded the motor control switch 88 is closed, and after it remains closed for the same specified length of time, the compressor motor 56 is energized. However, the compressor motor current does not pass through the Darlington amplifier 106. The amplifier does carry current through the energization circuit for the relay coil 100 which causes armature 158 of the relay 68 to be pulled in a direction to close the relay contacts to complete the energization circuit for the motor 56. This arrangement avoids the need for using a large solid-state switching device capable of carrying the energization current of the pump motor which is in the order of 28 amperes.

In one working embodiment of the above-described circuit, the electrical and mechanical components have the following ratings:

| Item | Rating |
| --- | --- |
| Darlington amplifier 106 | GE-D28C5—½ amp |
| Resistor 126 | 200 kΩ |
| Capacitor 128 | 50 mfd. |
| Transistor 132 | GE-2N5172 |
| Resistor 144 | 10 kΩ |
| Resistor 148 | 2 kΩ |
| Resistor 160 | 1 kΩ |

In the aforementioned circuit, the time delay function provided by the RC circuit defined by resistor 126 and capacitor 128 is five seconds.

Another feature of this arrangement is that the Darlington amplifier 106 can be triggered in a range from 1 to 1.6 volts depending upon the temperature condition of operation, even with the charging source varying in the range from 10 to 15 volts.

Another advantage is that the ratio of the reset bias resistor 160 to the timing circuit resistor 126 is 1 to 200 (1/200) which allows the capacitor to be recharged to an initial negative battery voltage at the base of the Darlington amplifier 106 in much shorter period of time than the 10-second timing period that it takes to charge the Darlington amplifier 106 to a turn on voltage through the timing circuit defined by resistor 126, capacitor 128 and the transistor 132. In this way a long time delay can be achieved with a small low-cost capacitor and a fast reset time is available because of the switching action of the low cost transistor 132.

Because of this ratio the charging time to turn on the Darlington amplifier 106 is in the order of ten seconds and the reset time is in the order of one-fourth second which in effect is instantaneous insofar as the operational characteristics of the mechanical leveling system is concerned.

While the embodiments of the present invention, as herein disclosed, constitute a preferred form, it is to be understood that other forms might be adopted.

What is claimed is:

1. A control circuit for selective energization of first and second electrical components comprising; first and second power input terminal adapted to be electrically connected to the first and second electrical component respectively, a solid-state switching device adapted to be connected to each of said electrical components for regulating current flow therethrough from said first and second power terminals, means for controlling conductivity of said solid-state switching device including timer means, means including a first diode and a second diode for connecting said first and second power terminals respectively to said timer means for initiating a predetermined time delay cycle when either one of said first and second power terminals is connected to a power source, and said diodes preventing crosscurrent energization of one of said electrical components form the power terminal of the other of said electrical components, said timer means being responsive to a predetermined signal from said power terminals to condition said solid state switching device to produce delayed energization of one or the other of the electrical components when the power terminal thereto is connected to a power source, and reset means for resetting said timer means when the signal from one or the other of said power terminals is interrupted whereby energization of one or the other of said electrical components only follows a predetermined fixed time period following connection of one or the other of said power terminals is to a power source, said reset means including a transistor element having its collector connected to said timer means and having its base emitter junction connected by said diodes to said power terminals.

2. An electrical circuit for controlling energization of first and second electrical components in a vehicle-leveling system comprising; first static switching means for controlling the energization of each of components, timer means for controlling conductivity of said switching means following a predetermined delay period, power circuit means for directing a predetermined signal to said timer means reflecting an above height position of the leveling system, said first power circuit means and said static switching means together forming an energization circuit for one of said components, second power circuit means for directing a second signal to said timer means when the leveling system is below level, said second power circuit means and said solid state switching device defining a second energization circuit for said component, means for preventing cross current flow of the signal in either of said first or second power supply circuits to the other of said components as one or the other of said signals is directed to said timer means, second static switching means controlling said timer means to initiate a time delay cycle when a signal is imposed on either of said power circuit means, said timer means turning on said first static switching means following a predetermined time delay, said second static switching means turning off immediately when a signal is no longer on said first or second power circuit means, and resistance means connected to a power source to reset said timer means to maintain a constant time delay prior to energization of said components.

3. An electronic control circuit for regulating energization of a motor control relay and a solenoid operated valve comprising; a three terminal switching device having the anode terminal thereof adapted to be electrically connected to electrically energizable components of said motor control relay and said solenoid operated valve, first and second switch means electrically connecting each of said energizable components to a power source, means including said first and second switch means and said three-terminal switching device for selectively energizing said components, timer means for controlling conductivity of said three-terminal switching device including a resistance and capacitor and a second three-terminal switch device for controlling charging of said capacitor, means for maintaining said second three-terminal switching device conductive to charge said capacitor when said first or second switch means electrically connects either of said electrical components to the power source, said capacitor having its cathode terminal connected to the control terminal of said first three-terminal switching device and being charged through said conductive second switching device from a negative voltage relative to the power source at the cathode terminal of said capacitor to a predetermined positive voltage at the cathode terminal to produce an extended delay period following connection of said components to the power source before said components are energized, a pair of diodes connected between said timer means and each of said electrically energizable components to insure that only one component is energized when said first three-terminal switching device is turned on, and means for resetting said capacitor at a rate substantially greater than the charge rate to charge said capacitor from negative to positive, said reset means including said second three-terminal switching device and a low-impedance path from said power source.

4. An electronic control circuit for regulating energization of an electrically energizable component comprising; a three-terminal switching device having the anode terminal thereof adapted to be electrically connected to the electrically energizable component, a power source, switch means for electrically connecting said energizable component to said power source, means including said switch means and said three-terminal switching device for selectively energizing said component, timer means for controlling conductivity of said three-terminal switching device including a resistance and capacitor and a second three-terminal switching device having its input terminal connected in series with the positive terminal of said capacitor and its output terminal connected to ground for charging of said capacitor, means for maintaining said second three-terminal switching device conductive to charge said capacitor when said switching means electrically connects said component to the power source, said capacitor having its cathode terminal connected to the control terminal of said first three-terminal switching device and being charged through said conductive second switching device from a negative voltage relative to the power source at the cathode terminal of said capacitor to a predetermined positive voltage at the cathode terminal to produce an extended delay period following connection of said component to the power source before said component is energized, and reset means including a bias resistor continuously connected between said power source and the junction between the positive terminal of said capacitor and the input terminal of said second switching device for charging said positive terminal of said capacitor to a negative voltage relative to said power source at a charge rate substantially greater than the charge rate to charge said capacitor from negative to positive, said reset means being operative when said second three-terminal switching device is nonconductive for maintaining a continuous current path from said power source to the positive terminal of said timer means capacitor, said reset bias resistor having a resistance value substantially less than that of said timer means resistance to cause the positive terminal of said capacitor to be quickly recharged to the voltage of said power source to produce an initial negative voltage at the control terminal of said first-mentioned three terminal switching device equal to the voltage of said power source whereby a long-time delay control can be obtained with a smaller capacitor.

* * * * *

PO-1050
(5/69)

UNITED STATES PATENT OFFICE
CERTIFICATE OF CORRECTION

Patent No. 3,624,456      Dated November 13, 1971

Inventor(s) James O. Elliott

It is certified that error appears in the above-identified patent and that said Letters Patent are hereby corrected as shown below:

Column 1, line 13, delete "of";
          line 71, "react" should be -- reset --;
Column 2, line 69, "invention" should be -- connected --;
Column 3, line 11, "shown" should be -- showing --;
Column 4, line 1, "indicates" should be -- includes --;
          line 75, "test" should be -- reset --;
Column 6, line 15, delete the hyphen between "long-delay", Column 7, line 3, insert -- a -- before "much" --;
          line 33, "form" should be -- from --;
          line 52, insert -- said -- before "components";
          line 62, insert -- second -- before "component";
Column 8, line 13, "switch" should be -- switching --;
          line 50, "switching" should be -- switch --.

Signed and sealed this 22nd day of August 1972.

(SEAL)
Attest:

EDWARD M.FLETCHER,JR.      ROBERT GOTTSCHALK
Attesting Officer             Commissioner of Patents